(12) United States Patent
D'Amato

(10) Patent No.: US 8,932,428 B2
(45) Date of Patent: Jan. 13, 2015

(54) INSULATED CONTAINER, METHOD OF FABRICATING SAME AND APPARATUS FOR FABRICATING

(71) Applicant: Seda S.p.A., Arzano Napoli (IT)

(72) Inventor: Gianfranco D'Amato, Arzano Naples (IT)

(73) Assignee: Seda S.p.A., Arzano Napoli (IT)

( * ) Notice: Subject to any disclaimer, the term of this patent is extended or adjusted under 35 U.S.C. 154(b) by 0 days.

(21) Appl. No.: 14/187,121

(22) Filed: Feb. 21, 2014

(65) Prior Publication Data

US 2014/0196838 A1 Jul. 17, 2014

Related U.S. Application Data

(62) Division of application No. 12/398,373, filed on Mar. 5, 2009, now Pat. No. 8,794,294, which is a division of application No. 11/404,152, filed on Apr. 14, 2006, now Pat. No. 8,360,263.

(60) Provisional application No. 60/672,195, filed on Apr. 15, 2005, provisional application No. 60/671,798, filed on Apr. 15, 2005.

(51) Int. Cl.
*B32B 37/00* (2006.01)
*B29C 65/18* (2006.01)
*B65D 81/38* (2006.01)
*A47J 41/00* (2006.01)
*B29C 65/00* (2006.01)

(52) U.S. Cl.
CPC ............ *B29C 65/18* (2013.01); *B65D 81/3869* (2013.01); *B65D 81/3874* (2013.01); *A47J 41/0072* (2013.01); *B29C 66/81* (2013.01)

USPC .......................................... 156/290; 156/293

(58) Field of Classification Search
USPC ........ 156/69, 227, 290, 293, 580, 581, 583.1; 493/100, 111, 128, 141, 150
See application file for complete search history.

(56) References Cited

U.S. PATENT DOCUMENTS 23,200 A 3/1859 Stimpson
1,031,514 A 7/1912 Bjorkstam et al.
(Continued)

FOREIGN PATENT DOCUMENTS

AR 047625 2/2006
AT 141212 8/1996
(Continued)

OTHER PUBLICATIONS

EPO Office Action dated Feb. 24, 2014 which issued in corresponding EP application No. 08 012 332.6-1708.

(Continued)

*Primary Examiner* — James Sells
(74) *Attorney, Agent, or Firm* — Fish & Richardson P.C.

(57) ABSTRACT

The invention relates to an insulated container for hot drinks or the like comprising an inner cup having a generally frusto-conical cup body and a generally frusto-conical outer shell. The cup is seated within the shell so that a contact path is disposed near the upper edge of the shell, along which contact path the outer surface of the cup body and inner surface of the shell are in contact. At least one bonding spot and/or bonding area for bonding said shell to said cup body is locally formed within said contact path.

26 Claims, 8 Drawing Sheets

(56) References Cited

U.S. PATENT DOCUMENTS

| | | |
|---|---|---|
| 1,520,870 A | 12/1924 | Koch |
| 1,549,417 A | 8/1925 | Hendrich |
| 1,615,319 A | 1/1927 | Wynn |
| 1,654,318 A | 12/1927 | Benson |
| 1,685,494 A | 9/1928 | Koch |
| 1,756,243 A | 4/1930 | Benson |
| 1,759,407 A | 5/1930 | Kingsbury |
| 1,814,671 A | 7/1931 | Dufour |
| 2,053,726 A | 9/1936 | Marshall |
| 2,134,427 A | 10/1938 | Biderman |
| 2,156,328 A | 5/1939 | Barbieri |
| 2,157,054 A | 5/1939 | Gammeter |
| 2,288,602 A | 5/1939 | Benton |
| 2,170,060 A | 8/1939 | Meyer |
| 2,226,340 A | 12/1940 | Flood |
| 2,235,963 A | 3/1941 | McGirr et al. |
| 2,240,599 A | 5/1941 | Amberg |
| 2,266,828 A | 12/1941 | Sykes |
| 2,416,813 A | 3/1947 | Cesare |
| 2,462,497 A | 2/1949 | Heyman |
| 2,493,633 A | 1/1950 | Mart |
| 2,540,565 A | 2/1951 | Barbieri |
| 2,563,352 A | 8/1951 | Morse |
| 2,591,578 A | 4/1952 | McNealy et al. |
| 2,661,889 A | 12/1953 | Phinney |
| 2,666,542 A | 1/1954 | Price |
| 2,675,954 A | 4/1954 | Vogel |
| 2,689,424 A | 9/1954 | Clagett |
| 2,695,744 A | 11/1954 | Gattuso |
| 2,721,686 A | 10/1955 | Reifsnyder et al. |
| 2,725,733 A | 12/1955 | Howlett |
| 2,740,575 A | 4/1956 | Fontaine |
| 2,828,903 A | 4/1958 | Adkins |
| 2,863,585 A | 12/1958 | Meshberg |
| 2,899,098 A | 8/1959 | Gits |
| 3,065,875 A | 11/1962 | Negoro |
| 3,079,027 A | 2/1963 | Edwards |
| 3,082,900 A | 3/1963 | Goodman |
| 3,109,252 A | 11/1963 | Schellenberg |
| 3,139,213 A | 6/1964 | Edwards |
| RE25,618 E | 7/1964 | Goodman |
| 3,208,631 A | 9/1965 | Edwards |
| 3,225,954 A | 12/1965 | Herrick et al. |
| 3,298,893 A | 1/1967 | Allen |
| 3,355,046 A | 11/1967 | Jolly |
| 3,372,830 A | 3/1968 | Edwards |
| 3,401,862 A | 9/1968 | Wanderer |
| 3,428,214 A | 2/1969 | Leon |
| 3,443,714 A | 5/1969 | Edwards |
| 3,456,860 A | 7/1969 | Janninck |
| 3,471,075 A | 10/1969 | Wolf |
| 3,485,412 A | 12/1969 | Hawley |
| 3,526,316 A | 9/1970 | Kalogris |
| 3,531,015 A | 9/1970 | Makin |
| 3,580,468 A | 5/1971 | McDevitt |
| 3,583,596 A | 6/1971 | Brewer |
| 3,612,346 A | 10/1971 | Schneider et al. |
| 3,645,758 A | 2/1972 | MacManus |
| 3,700,018 A | 10/1972 | Goglio |
| 3,737,093 A | 6/1973 | Amberg et al. |
| 3,739,975 A | 6/1973 | Davidow |
| 3,747,830 A | 7/1973 | Goldman |
| 3,749,277 A | 7/1973 | Kinney |
| 3,765,559 A | 10/1973 | Sauey et al. |
| 3,766,975 A | 10/1973 | Todd |
| D231,068 S | 4/1974 | Douglas |
| 3,850,361 A | 11/1974 | Day et al. |
| 3,878,282 A | 4/1975 | Bonis et al. |
| 3,884,350 A | 5/1975 | Johansson |
| 3,908,523 A | 9/1975 | Shikaya |
| 3,927,766 A | 12/1975 | Day |
| 3,934,749 A | 1/1976 | Andrulionis |
| 3,955,697 A | 5/1976 | Valyi |
| 4,007,670 A | 2/1977 | Albano et al. |
| 4,018,904 A | 4/1977 | Muraoka |
| 4,040,537 A | 8/1977 | Edwards |
| 4,049,122 A | 9/1977 | Maxwell |
| 4,089,358 A | 5/1978 | Korson |
| 4,102,454 A | 7/1978 | Karevaara et al. |
| 4,124,120 A | 11/1978 | Day |
| 4,129,065 A | 12/1978 | Corse et al. |
| 4,187,768 A | 2/1980 | Suzuki |
| 4,211,024 A | 7/1980 | Nickell |
| 4,231,476 A | 11/1980 | Compton et al. |
| 4,261,501 A | 4/1981 | Watkins et al. |
| 4,292,194 A | 9/1981 | Perazzoni et al. |
| 4,308,679 A | 1/1982 | Ray, III et al. |
| 4,318,235 A | 3/1982 | Augeri |
| 4,324,338 A | 4/1982 | Beall |
| 4,327,136 A | 4/1982 | Thompson et al. |
| 4,344,814 A | 8/1982 | McLaren |
| 4,345,393 A | 8/1982 | Price et al. |
| 4,368,818 A | 1/1983 | Day et al. |
| 4,409,122 A | 10/1983 | Kleuskens et al. |
| 4,514,242 A | 4/1985 | MacLaughlin et al. |
| 4,548,348 A | 10/1985 | Clements |
| 4,560,075 A | 12/1985 | Lu |
| 4,571,233 A | 2/1986 | Konzal |
| 4,574,987 A | 3/1986 | Halligan et al. |
| 4,684,553 A | 8/1987 | Sasaki et al. |
| 4,706,873 A | 11/1987 | Schulz |
| 4,771,911 A | 9/1988 | Morony et al. |
| 4,775,523 A | 10/1988 | Sparacio et al. |
| 4,789,073 A | 12/1988 | Fine |
| 4,792,042 A | 12/1988 | Koehn et al. |
| 4,813,862 A | 3/1989 | Bowers et al. |
| 4,850,496 A | 7/1989 | Rudell et al. |
| 4,863,014 A | 9/1989 | Summons et al. |
| 4,936,448 A | 6/1990 | Holloway |
| 4,993,580 A | 2/1991 | Smith |
| 4,997,691 A | 3/1991 | Parkinson |
| 5,021,274 A | 6/1991 | Beck et al. |
| 5,025,981 A | 6/1991 | Schellenberg |
| 5,076,463 A | 12/1991 | McGraw |
| 5,078,313 A | 1/1992 | Matheson et al. |
| 5,092,485 A | 3/1992 | Lee |
| 5,135,132 A | 8/1992 | Potochnik |
| 5,145,107 A | 9/1992 | Silver et al. |
| 5,226,585 A | 7/1993 | Varano |
| 5,253,781 A | 10/1993 | Van Melle et al. |
| 5,363,982 A | 11/1994 | Sadlier |
| 5,385,260 A | 1/1995 | Gatcomb |
| 5,395,005 A | 3/1995 | Yoshida |
| 5,425,497 A | 6/1995 | Sorenson |
| 5,425,498 A | 6/1995 | Hallam et al. |
| 5,460,323 A | 10/1995 | Titus |
| 5,484,167 A | 1/1996 | Donaldson et al. |
| 5,489,063 A | 2/1996 | Buchalski et al. |
| 5,524,817 A | 6/1996 | Meier et al. |
| 5,542,599 A | 8/1996 | Sobol |
| 5,547,124 A | 8/1996 | Mueller |
| 5,551,592 A | 9/1996 | Barton et al. |
| 5,553,735 A | 9/1996 | Kimura |
| 5,573,141 A | 11/1996 | Chen |
| 5,586,689 A | 12/1996 | O'Amato et al. |
| 5,593,053 A | 1/1997 | Kaufman et al. |
| 5,628,453 A | 5/1997 | MacLaughlin |
| 5,660,326 A | 8/1997 | Varano et al. |
| 5,671,353 A | 9/1997 | Tian et al. |
| 5,674,546 A | 10/1997 | Barnes et al. |
| 5,678,725 A | 10/1997 | Yamada et al. |
| 5,685,480 A | 11/1997 | Choi |
| 5,697,550 A | 12/1997 | Varano et al. |
| 5,713,512 A | 2/1998 | Barrett |
| 5,752,653 A | 5/1998 | Razzaghi |
| RE35,830 E | 6/1998 | Sadlier |
| 5,769,262 A | 6/1998 | Yamada et al. |
| 5,769,311 A | 6/1998 | Morita et al. |
| 5,772,111 A | 6/1998 | Kirsch |
| 5,794,843 A | 8/1998 | Sanchez |
| 5,820,016 A | 10/1998 | Stropkay |
| 5,823,948 A | 10/1998 | Ross, Jr. et al. |
| 5,839,599 A | 11/1998 | Lin |
| 5,839,653 A | 11/1998 | Zadravetz |

(56) References Cited

U.S. PATENT DOCUMENTS

| | | | |
|---|---|---|---|
| 5,894,948 A | 4/1999 | Yeh |
| 5,903,889 A | 5/1999 | De la Huerga et al. |
| 5,913,449 A | 6/1999 | Branch et al. |
| 5,918,761 A | 7/1999 | Wissinger |
| 5,944,208 A | 8/1999 | Gale |
| 5,950,917 A | 9/1999 | Smith |
| 5,953,419 A | 9/1999 | Lohstroh et al. |
| 5,954,217 A | 9/1999 | Brkovic et al. |
| 5,956,400 A | 9/1999 | Chaum et al. |
| 5,964,400 A | 10/1999 | Varano et al. |
| 5,975,344 A | 11/1999 | Stevens |
| 5,996,887 A | 12/1999 | Cai et al. |
| 6,036,801 A | 3/2000 | Yamada et al. |
| 6,047,488 A | 4/2000 | Tuszkiewicz |
| 6,050,443 A | 4/2000 | Tung |
| 6,056,144 A | 5/2000 | Strange et al. |
| 6,065,632 A | 5/2000 | Moore, Jr. |
| 6,068,181 A | 5/2000 | Cai |
| 6,076,699 A | 6/2000 | Seager et al. |
| 6,085,970 A | 7/2000 | Sadlier |
| 6,109,518 A | 8/2000 | Mueller et al. |
| 6,116,503 A | 9/2000 | Varano |
| 6,126,584 A | 10/2000 | Zadravetz |
| 6,145,656 A | 11/2000 | Marco |
| 6,148,342 A | 11/2000 | Ho |
| 6,161,720 A | 12/2000 | Castle |
| 6,193,098 B1 | 2/2001 | Mochizuki et al. |
| 6,196,454 B1 | 3/2001 | Sadlier |
| 6,210,766 B1 | 4/2001 | McLaughlin |
| 6,224,954 B1 | 5/2001 | Mitchell et al. |
| 6,237,845 B1 | 5/2001 | Hashimoto et al. |
| 6,253,995 B1 | 7/2001 | Blok et al. |
| 6,257,485 B1 | 7/2001 | Sadlier et al. |
| 6,260,021 B1 | 7/2001 | Wong et al. |
| 6,260,756 B1 | 7/2001 | Mochizuki et al. |
| 6,263,330 B1 | 7/2001 | Bessette et al. |
| 6,265,040 B1 | 7/2001 | Neale et al. |
| 6,286,754 B1 | 9/2001 | Stier et al. |
| 6,287,247 B1 | 9/2001 | Dees et al. |
| 6,315,192 B1 | 11/2001 | Marlow |
| 6,343,735 B1 | 2/2002 | Cai |
| 6,367,652 B1 | 4/2002 | Toida et al. |
| 6,378,763 B1 | 4/2002 | Nelson et al. |
| 6,378,766 B2 | 4/2002 | Sadlier |
| 6,382,449 B1 | 5/2002 | Kazmierski et al. |
| 6,401,955 B1 | 6/2002 | Yang et al. |
| 6,419,108 B1 | 7/2002 | Toida et al. |
| 6,422,456 B1 | 7/2002 | Sadlier |
| 6,424,996 B1 | 7/2002 | Killcommons et al. |
| 6,449,621 B1 | 9/2002 | Pettovello |
| 6,457,585 B1 | 10/2002 | Huffer et al. |
| 6,463,417 B1 | 10/2002 | Schoenberg |
| 6,557,102 B1 | 4/2003 | Wong et al. |
| 6,557,751 B2 | 5/2003 | Puerini |
| 6,562,270 B1 | 5/2003 | Gannon et al. |
| 6,568,587 B1 | 5/2003 | Yamada et al. |
| 6,574,629 B1 | 6/2003 | Cooke, Jr. et al. |
| 6,574,742 B1 | 6/2003 | Jamroga et al. |
| 6,598,786 B1 | 7/2003 | Guo |
| 6,611,846 B1 | 8/2003 | Stoodley et al. |
| 6,612,456 B1 | 9/2003 | Hundley et al. |
| 6,648,176 B1 | 11/2003 | Donovan |
| 6,651,060 B1 | 11/2003 | Harper et al. |
| 6,663,926 B1 | 12/2003 | Okushita et al. |
| 6,678,703 B2 | 1/2004 | Rothschild et al. |
| 6,678,764 B2 | 1/2004 | Parvulescu et al. |
| 6,688,487 B2 | 2/2004 | Oakes et al. |
| 6,691,134 B1 | 2/2004 | Babula et al. |
| 6,738,798 B1 | 5/2004 | Ploetz et al. |
| 6,746,743 B2 | 6/2004 | Knoerzer et al. |
| 6,749,913 B2 | 6/2004 | Watanabe et al. |
| 6,763,344 B1 | 7/2004 | Osentoski et al. |
| 6,775,670 B2 | 8/2004 | Bessette et al. |
| 6,811,843 B2 | 11/2004 | DeBraai et al. |
| 6,852,381 B2 | 2/2005 | DeBraai et al. |
| 6,908,651 B2 | 6/2005 | Watanabe et al. |
| 6,921,179 B2 | 7/2005 | Diak Ghanem |
| 6,926,197 B2 | 8/2005 | Hed et al. |
| 6,989,198 B2 | 1/2006 | Masuda et al. |
| 7,100,770 B2 | 9/2006 | D'Amato et al. |
| 7,117,579 B2 | 10/2006 | Schellenberg |
| 7,172,086 B2 | 2/2007 | McKendry et al. |
| 7,175,585 B2 | 2/2007 | Okushita et al. |
| 7,195,805 B2 | 3/2007 | Breining et al. |
| D546,625 S | 7/2007 | Gluck |
| D547,122 S | 7/2007 | Gluck |
| D550,033 S | 9/2007 | Bodum |
| D550,034 S | 9/2007 | Bodum |
| D551,502 S | 9/2007 | Bodum |
| D553,437 S | 10/2007 | Bodum |
| D553,439 S | 10/2007 | Bodum |
| D553,440 S | 10/2007 | Bodum |
| D553,442 S | 10/2007 | Bodum |
| D553,909 S | 10/2007 | Bodum |
| D553,910 S | 10/2007 | Bodum |
| D553,911 S | 10/2007 | Bodum |
| 7,281,650 B1 | 10/2007 | Milan |
| D557,561 S | 12/2007 | Flowers et al. |
| D557,563 S | 12/2007 | Bodum |
| D557,564 S | 12/2007 | Bodum |
| 7,306,113 B2 | 12/2007 | El-Saden et al. |
| D562,075 S | 2/2008 | Mehta |
| D563,172 S | 3/2008 | Bodum |
| 7,344,038 B2 | 3/2008 | Elansary |
| D577,260 S | 9/2008 | Bodum |
| 7,451,910 B2 | 11/2008 | Frost et al. |
| 7,451,911 B2 | 11/2008 | Stepanek, Jr. |
| D581,738 S | 12/2008 | Bodum |
| D581,739 S | 12/2008 | Bodum |
| 7,458,504 B2 | 12/2008 | Robertson et al. |
| 7,481,356 B2 | 1/2009 | Stahlecker et al. |
| 7,536,767 B2 | 5/2009 | Hollis et al. |
| D594,277 S | 6/2009 | Snell |
| D595,090 S | 6/2009 | Benson |
| 7,552,841 B2 | 6/2009 | Hollis et al. |
| D597,791 S | 8/2009 | Lion et al. |
| D597,792 S | 8/2009 | Lion et al. |
| 7,597,246 B2 | 10/2009 | Stepanek, Jr. |
| 7,631,781 B2 | 12/2009 | Chen |
| 7,677,435 B2 | 3/2010 | Stahlecker |
| 7,694,843 B2 | 4/2010 | Hollis et al. |
| 7,699,216 B2 | 4/2010 | Smith et al. |
| 7,717,325 B2 | 5/2010 | Puls et al. |
| 7,753,832 B2 | 7/2010 | Karine et al. |
| 7,968,033 B2 * | 6/2011 | Mazzarolo .................. 264/274 |
| 8,360,263 B2 | 1/2013 | D'Amato |
| 8,794,294 B2 * | 8/2014 | D'Amato ................... 156/583.1 |
| 2001/0013537 A1 | 8/2001 | Sadlier |
| 2001/0032100 A1 | 10/2001 | Mahmud et al. |
| 2001/0041991 A1 | 11/2001 | Segal et al. |
| 2002/0010679 A1 | 1/2002 | Felsher |
| 2002/0043555 A1 | 4/2002 | Mader |
| 2002/0148832 A1 | 10/2002 | Breining et al. |
| 2002/0156650 A1 | 10/2002 | Klein et al. |
| 2002/0172818 A1 | 11/2002 | DeBraai et al. |
| 2003/0029876 A1 | 2/2003 | Giraud |
| 2003/0088441 A1 | 5/2003 | McNerney |
| 2003/0116576 A1 | 6/2003 | Lang-Boecker |
| 2003/0121963 A1 | 7/2003 | Van Handel |
| 2003/0140044 A1 | 7/2003 | Mok et al. |
| 2003/0226882 A1 | 12/2003 | Porchia et al. |
| 2004/0034550 A1 | 2/2004 | Menschik et al. |
| 2004/0069311 A1 | 4/2004 | Sasaki et al. |
| 2004/0094612 A1 | 5/2004 | D'Amato |
| 2004/0112949 A1 | 6/2004 | Hed et al. |
| 2004/0133797 A1 | 7/2004 | Arnold |
| 2004/0139222 A1 | 7/2004 | Silk et al. |
| 2004/0154156 A1 | 8/2004 | Schellenberg |
| 2004/0199765 A1 | 10/2004 | Kohane et al. |
| 2004/0226948 A1 | 11/2004 | Okushita et al. |
| 2005/0006385 A1 | 1/2005 | D'Amato |
| 2005/0029337 A1 | 2/2005 | Van Handel |
| 2005/0040218 A1 | 2/2005 | Hinchey et al. |
| 2005/0045643 A1 | 3/2005 | Ghanem |

(56) References Cited

U.S. PATENT DOCUMENTS

| | | |
|---|---|---|
| 2005/0115975 A1 | 6/2005 | Smith et al. |
| 2005/0164859 A1 | 7/2005 | Karine et al. |
| 2005/0184074 A1 | 8/2005 | Simmons et al. |
| 2005/0199697 A1 | 9/2005 | Nugent |
| 2005/0205651 A1 | 9/2005 | Marx |
| 2005/0236468 A1 | 10/2005 | Sadlier |
| 2005/0258225 A1 | 11/2005 | Martin |
| 2005/0269390 A1 | 12/2005 | Martin |
| 2006/0038001 A1 | 2/2006 | Stepanek |
| 2006/0118608 A1 | 6/2006 | Stahlecker |
| 2006/0131316 A1 | 6/2006 | Bresler |
| 2006/0144915 A1 | 7/2006 | Sadlier |
| 2006/0186012 A1 | 8/2006 | D'Amato |
| 2006/0226210 A1 | 10/2006 | Stahlecker |
| 2006/0237465 A1 | 10/2006 | D'Amato |
| 2006/0283855 A1 | 12/2006 | Hollis et al. |
| 2006/0289610 A1 | 12/2006 | Kling |
| 2007/0262129 A1 | 11/2007 | Zadravetz |
| 2007/0284426 A1 | 12/2007 | Lo |
| 2008/0006643 A1 | 1/2008 | Ma |
| 2008/0023536 A1 | 1/2008 | Frost et al. |
| 2008/0023537 A1 | 1/2008 | Frost et al. |
| 2008/0023538 A1 | 1/2008 | Robertson et al. |
| 2008/0029588 A1 | 2/2008 | Messerschmid et al. |
| 2008/0078825 A1 | 4/2008 | Puls et al. |
| 2008/0087677 A1 | 4/2008 | Robertson et al. |
| 2008/0087715 A1 | 4/2008 | Robertson et al. |
| 2008/0087716 A1 | 4/2008 | Sadlier |
| 2008/0093434 A1 | 4/2008 | Van Handel |
| 2008/0105692 A1 | 5/2008 | Hiromori |
| 2008/0105693 A1 | 5/2008 | Hechmati |
| 2008/0121681 A1 | 5/2008 | Wiedmeyer |
| 2008/0128433 A1 | 6/2008 | Stauffer et al. |
| 2008/0128481 A1 | 6/2008 | Robertson |
| 2008/0156857 A1 | 7/2008 | Johnston |
| 2008/0169297 A1 | 7/2008 | Kelly |
| 2008/0264937 A1 | 10/2008 | D'Amato |
| 2008/0272118 A1 | 11/2008 | Wang |
| 2008/0280743 A1 | 11/2008 | Stahlecker et al. |
| 2008/0302800 A1 | 12/2008 | Chou |
| 2008/0308620 A1 | 12/2008 | Stepanek, Jr. |
| 2009/0020597 A1 | 1/2009 | D'Amato |
| 2009/0121007 A1 | 5/2009 | Van Handel |
| 2009/0159653 A1 | 6/2009 | Stahlecker |
| 2009/0166402 A1 | 7/2009 | D'Amato |
| 2009/0170680 A1 | 7/2009 | D'Amato |
| 2009/0184020 A1 | 7/2009 | Messerschmid et al. |
| 2009/0218390 A1 | 9/2009 | Chang |
| 2009/0230178 A1 | 9/2009 | Stahlecker et al. |
| 2009/0294520 A1 | 12/2009 | Stepanek, Jr. |
| 2009/0321440 A1 | 12/2009 | Fedusa et al. |
| 2009/0321508 A1 | 12/2009 | Fu et al. |
| 2010/0025283 A1 | 2/2010 | Oshima et al. |
| 2010/0044424 A1 | 2/2010 | Van Handel |
| 2010/0065622 A1 | 3/2010 | Chang |
| 2010/0072268 A1 | 3/2010 | Johnson et al. |

FOREIGN PATENT DOCUMENTS

| | | |
|---|---|---|
| AT | 2637091 | 4/2004 |
| AU | 4557993 | 3/1994 |
| AU | 2008264158 | 8/2009 |
| AU | 2009200641 | 10/2009 |
| BE | 410215 | 7/1935 |
| BE | 897862 | 3/1984 |
| BR | PI0900078 | 9/2009 |
| CA | 742539 | 9/1966 |
| CA | 837922 | 3/1970 |
| CA | 844949 | 6/1970 |
| CA | 1007182 | 3/1977 |
| CA | 1082657 | 7/1980 |
| CA | 1125680 | 6/1982 |
| CA | 1125681 | 6/1982 |
| CA | 1152011 | 8/1983 |
| CA | 1239885 | 8/1988 |
| CA | 1249232 | 1/1989 |
| CA | 1257209 | 7/1989 |
| CA | 2021035 | 1/1991 |
| CA | 2026197 | 8/1991 |
| CA | 2060135 | 7/1992 |
| CA | 2150306 | 2/1996 |
| CA | 2043958 | 7/1996 |
| CA | 2286498 | 4/2000 |
| CA | 2176080 | 8/2001 |
| CA | 2228749 | 10/2001 |
| CA | 2141730 | 5/2002 |
| CA | 2197976 | 5/2002 |
| CA | 2432791 | 6/2002 |
| CA | 2165509 | 7/2002 |
| CA | 2436505 | 8/2002 |
| CA | 2233356 | 11/2002 |
| CA | 2431542 | 12/2002 |
| CA | 2431869 | 12/2002 |
| CA | 2219845 | 4/2003 |
| CA | 2244689 | 9/2003 |
| CA | 2271581 | 12/2003 |
| CA | 2121491 | 7/2004 |
| CA | 2542905 | 1/2005 |
| CA | 2564012 | 11/2005 |
| CA | 114070 | 2/2006 |
| CA | 2520024 | 3/2006 |
| CA | 2 262802 | 6/2006 |
| CA | 2549450 | 12/2006 |
| CA | 2608826 | 12/2006 |
| CA | 2262458 | 1/2007 |
| CA | 2613109 | 1/2007 |
| CA | 2621453 | 3/2007 |
| CA | 113773 | 4/2007 |
| CA | 119089 | 5/2007 |
| CA | 119090 | 5/2007 |
| CA | 119091 | 5/2007 |
| CA | 119092 | 5/2007 |
| CA | 2629190 | 5/2007 |
| CA | 118452 | 7/2007 |
| CA | 113355 | 9/2007 |
| CA | 115931 | 10/2007 |
| CA | 116240 | 10/2007 |
| CA | 116241 | 10/2007 |
| CA | 116348 | 10/2007 |
| CA | 119239 | 10/2007 |
| CA | 120446 | 10/2007 |
| CA | 2545497 | 11/2007 |
| CA | 2588413 | 11/2007 |
| CA | 2657721 | 1/2008 |
| CA | 116480 | 2/2008 |
| CA | 2598153 | 2/2008 |
| CA | 120 610 | 3/2008 |
| CA | 2520677 | 4/2008 |
| CA | 2664625 | 4/2008 |
| CA | 2665633 | 4/2008 |
| CA | 114549 | 5/2008 |
| CA | 121962 | 5/2008 |
| CA | 2610053 | 5/2008 |
| CA | 122120 | 6/2008 |
| CA | 122879 | 7/2008 |
| CA | 2267361 | 10/2008 |
| CA | 2598691 | 5/2009 |
| CA | 2347777 | 7/2009 |
| CA | 2311825 | 10/2009 |
| CA | 2405786 | 11/2009 |
| CA | 2394475 | 1/2010 |
| CA | 128485 | 2/2010 |
| CH | 678938 | 11/1991 |
| CN | 1082987 | 3/1994 |
| CN | 1128744 | 8/1996 |
| CN | 1237133 | 12/1999 |
| CN | 1272089 | 11/2000 |
| CN | 1288427 | 3/2001 |
| CN | 2484866 | 4/2002 |
| CN | 2526274 | 12/2002 |
| CN | 1489541 | 4/2004 |
| CN | 1781813 | 6/2006 |
| CN | 101489771 | 7/2009 |

(56) References Cited

FOREIGN PATENT DOCUMENTS

| | | |
|---|---|---|
| CN | 101492107 | 7/2009 |
| CN | 101531070 | 9/2009 |
| DE | 652737 | 11/1937 |
| DE | 18806777 | 5/1963 |
| DE | 1191285 A | 4/1965 |
| DE | 3335833 | 4/1984 |
| DE | 9115069 | 1/1992 |
| DE | 9215015 | 1/1993 |
| DE | 59002814 | 10/1993 |
| DE | 4226313 | 2/1994 |
| DE | 4393650 | 11/1995 |
| DE | 4421870 A1 | 1/1996 |
| DE | 59303454 | 9/1996 |
| DE | 19840841 | 3/2000 |
| DE | 10056811 | 7/2001 |
| DE | 10054727 | 5/2002 |
| DE | 20110390 U1 | 10/2002 |
| DE | 20310623 | 11/2003 |
| DE | 60102661 | 8/2004 |
| DE | 102004056932 | 5/2006 |
| DE | 102005017741 | 10/2006 |
| DE | 102006025612 | 11/2007 |
| DE | 102007024243 | 1/2008 |
| DE | 102007024254 | 1/2008 |
| DE | 102007030864 | 1/2008 |
| DE | 102008005403 | 7/2009 |
| DE | 102008014878 | 9/2009 |
| EA | 200900031 | 8/2009 |
| EP | 0074936 | 3/1983 |
| EP | 0102149 | 3/1984 |
| EP | 0371918 | 6/1990 |
| EP | 0408515 | 1/1991 |
| EP | 0512179 | 11/1992 |
| EP | 0653983 | 5/1995 |
| EP | 0659647 | 6/1995 |
| EP | 0683033 | 11/1995 |
| EP | 0688720 | 12/1995 |
| EP | 0695692 | 2/1996 |
| EP | 0765821 | 4/1997 |
| EP | 0812668 | 12/1997 |
| EP | 0929455 | 7/1999 |
| EP | 0934202 | 8/1999 |
| EP | 0940240 | 9/1999 |
| EP | 1031514 | 8/2000 |
| EP | 1057733 | 12/2000 |
| EP | 1060879 | 12/2000 |
| EP | 1157943 | 11/2001 |
| EP | 1203728 | 5/2002 |
| EP | 1227042 | 7/2002 |
| EP | 1227043 | 7/2002 |
| EP | 1254842 | 11/2002 |
| EP | 1317380 | 6/2003 |
| EP | 1349789 | 10/2003 |
| EP | 1404580 | 4/2004 |
| EP | 1404590 | 4/2004 |
| EP | 1418272 | 5/2004 |
| EP | 1479512 | 11/2004 |
| EP | 1486424 | 12/2004 |
| EP | 1512527 | 3/2005 |
| EP | 1547762 | 6/2005 |
| EP | 1637457 | 3/2006 |
| EP | 1656300 | 5/2006 |
| EP | 1670688 | 6/2006 |
| EP | 1687213 | 8/2006 |
| EP | 1699326 | 9/2006 |
| EP | 1712490 | 10/2006 |
| EP | 1714912 | 10/2006 |
| EP | 1719715 | 11/2006 |
| EP | 1739029 | 1/2007 |
| EP | 1785370 | 5/2007 |
| EP | 1876106 | 1/2008 |
| EP | 1625079 | 2/2008 |
| EP | 1894847 | 3/2008 |
| EP | 1921023 | 5/2008 |
| EP | 1939099 | 7/2008 |
| EP | 1975083 | 10/2008 |
| EP | 1990184 | 11/2008 |
| EP | 2043853 | 4/2009 |
| EP | 2049325 | 4/2009 |
| EP | 2049326 | 4/2009 |
| EP | 2080715 | 7/2009 |
| EP | 2108506 | 10/2009 |
| EP | 2128041 | 12/2009 |
| EP | 2147871 | 1/2010 |
| EP | 2199222 | 6/2010 |
| EP | 2202178 | 6/2010 |
| ES | 2045882 | 1/1994 |
| ES | 2093443 | 12/1996 |
| ES | 2218361 | 11/2004 |
| FR | 791981 | 12/1935 |
| FR | 1490636 | 6/1967 |
| FR | 2160489 | 6/1973 |
| FR | 2813861 | 3/2002 |
| GB | 321176 | 10/1929 |
| GB | 0445661 | 4/1936 |
| GB | 484990 | 5/1938 |
| GB | 1261532 | 1/1972 |
| GB | 1261533 | 1/1972 |
| GB | 12611531 | 1/1972 |
| GB | 2044076 | 10/1980 |
| GB | 2055737 | 3/1981 |
| GB | 2061699 | 5/1981 |
| GB | 2073581 | 10/1981 |
| GB | 2074124 | 10/1981 |
| GB | 2077177 | 12/1981 |
| GB | 2078094 | 1/1982 |
| GB | 2130168 | 5/1984 |
| GB | 2333087 | 7/1999 |
| GB | 2420267 | 5/2006 |
| GB | 2425041 | 10/2006 |
| GB | 2426045 | 11/2006 |
| GB | 2445287 | 7/2008 |
| HK | 1034700 | 4/2004 |
| HK | 1063172 | 8/2006 |
| IT | 1366725 | 2/2006 |
| IT | MI0020060589 | 6/2006 |
| JP | 50052003 | 5/1975 |
| JP | 50120802 | 10/1975 |
| JP | 56156777 | 11/1981 |
| JP | 2509655 | 8/1989 |
| JP | 3023014 | 3/1991 |
| JP | 04097833 | 3/1992 |
| JP | 06048474 | 2/1994 |
| JP | 2007-149338 | 6/1995 |
| JP | 2010-278931 | 10/1998 |
| JP | 2010-338277 | 12/1998 |
| JP | 11321936 | 11/1999 |
| JP | 11342982 | 12/1999 |
| JP | 2000033931 | 2/2000 |
| JP | 2000095228 | 4/2000 |
| JP | 2000103478 | 4/2000 |
| JP | 2000103479 | 4/2000 |
| JP | 2000118520 | 4/2000 |
| JP | 2000-203664 | 7/2000 |
| JP | 2000190943 | 7/2000 |
| JP | 2000203664 | 7/2000 |
| JP | 2000-238739 | 9/2000 |
| JP | 2000281044 | 10/2000 |
| JP | 2000326951 | 11/2000 |
| JP | 2001/98355 | 4/2001 |
| JP | 2001097355 | 4/2001 |
| JP | 2001171642 | 6/2001 |
| JP | 2001180647 | 7/2001 |
| JP | 2001293802 | 10/2001 |
| JP | 2001294282 | 10/2001 |
| JP | 3248718 | 2/2002 |
| JP | 3274412 | 4/2002 |
| JP | 2003276721 | 10/2003 |
| JP | 2004090928 | 3/2004 |
| JP | 2004090929 | 3/2004 |
| JP | 2004522654 | 7/2004 |
| JP | 200614331 | 6/2006 |
| JP | 2009173346 | 8/2009 |
| KR | 2006056859 | 5/2006 |

(56) References Cited

FOREIGN PATENT DOCUMENTS

| | | |
|---|---|---|
| NL | 42544 | 2/1938 |
| SG | 0017419 | 12/2005 |
| TR | 200400866 | 6/2004 |
| TW | 393427 | 6/2000 |
| TW | 399609 | 7/2000 |
| WO | WO 94/03325 | 2/1994 |
| WO | WO 98/32601 | 7/1998 |
| WO | WO 99/11526 | 3/1999 |
| WO | WO 99/22686 | 5/1999 |
| WO | WO 99/59883 | 11/1999 |
| WO | WO 00/17058 | 3/2000 |
| WO | WO 00/28288 | 5/2000 |
| WO | WO 01/38180 | 5/2001 |
| WO | WO 02/04300 | 1/2002 |
| WO | WO 02/30783 | 4/2002 |
| WO | WO 02/49924 | 6/2002 |
| WO | WO 0247523 | 6/2002 |
| WO | WO03/057577 | 7/2003 |
| WO | WO 03/084739 | 10/2003 |
| WO | WO 2004/103845 | 12/2004 |
| WO | WO 2005/012114 | 2/2005 |
| WO | WO 2005/047126 | 5/2005 |
| WO | WO 2005/053487 | 6/2005 |
| WO | WO 2005054082 | 6/2005 |
| WO | WO 2005/075319 | 8/2005 |
| WO | WO 2005/100167 | 10/2005 |
| WO | WO 2005/102847 | 11/2005 |
| WO | WO 2007028623 | 3/2007 |
| WO | WO 2007/036928 | 4/2007 |
| WO | WO 2007/054179 | 5/2007 |
| WO | WO 2007/054318 | 5/2007 |
| WO | WO 2007/078446 | 7/2007 |
| WO | WO 2007/090415 | 8/2007 |
| WO | WO 2007/091068 | 8/2007 |
| WO | WO 2007/094838 | 8/2007 |
| WO | WO 2007/126783 | 11/2007 |
| WO | WO 2008/009371 | 1/2008 |
| WO | WO 2008/009372 | 1/2008 |
| WO | WO 2008/014230 | 1/2008 |
| WO | WO 2008/022180 | 2/2008 |
| WO | WO 2008/026161 | 3/2008 |
| WO | WO 2008/042378 | 4/2008 |
| WO | WO 2008/045708 | 4/2008 |
| WO | WO 2008/045944 | 4/2008 |
| WO | WO 2008/067865 | 6/2008 |
| WO | WO 2008/107657 | 9/2008 |
| WO | WO 2008/119938 | 10/2008 |
| WO | WO 2008/123783 | 10/2008 |
| WO | WO 2008/146115 | 12/2008 |
| WO | WO 2009/021305 | 2/2009 |
| WO | WO 2009/032837 | 3/2009 |
| WO | WO 2009/034323 | 3/2009 |
| WO | WO 2009/039632 | 4/2009 |
| WO | WO 2009/059352 | 5/2009 |
| WO | WO 2009/074285 | 6/2009 |
| WO | WO 2009/082660 | 7/2009 |
| WO | WO 2009/092557 | 7/2009 |
| WO | WO 2009/118772 | 10/2009 |
| WO | WO 2010/008629 | 1/2010 |
| WO | WO 2010/011627 | 1/2010 |
| WO | WO 2010/019146 | 2/2010 |
| WO | WO 2010/031764 | 3/2010 |
| WO | WO 2010/034869 | 4/2010 |
| WO | WO 2010/036645 | 4/2010 |
| WO | WO 2010/067047 | 6/2010 |

OTHER PUBLICATIONS

EPO Office Action dated Feb. 25, 2014 which issued in corresponding EP application No. 08 012 331.8-1708.
International Search Report from Corresponding International Application No. WIPO/EP2005/005406, dated Aug. 25, 2005, 2 pages.
International Search Report from International Application No. PCT/EP2006/009933, dated Oct. 4, 2007, 5 pages.
International Search Report mailed Jan. 15, 2007 in PCT/EP2006/008753.
Search Report for DE 203 19 691.0 mailed Aug. 24, 2004.
Statement of Case in Opposition to New Zealand Patent Application No. 543602, Mar. 22, 2007, 79 pages.
Statement of Case in Support of Notice of Opposition to Grant of Patent (Section 21) in New Zealand Patent Application No. 543602, Mar. 28, 2007, 16 paQes.

* cited by examiner

INSULATED CONTAINER, METHOD OF FABRICATING SAME AND APPARATUS FOR FABRICATING

RELATED APPLICATIONS

This application is a divisional application of U.S. Ser. No. 12/398,373 filed Mar. 5, 2009 now U.S. Pat. No. 8,794,294 which is a divisional of U.S. Ser. No. 11/404,152 filed Apr. 14, 2006 now U.S. Pat. No. 8,360,263 which, in turn, is related to, and claims priority from, U.S. Provisional Application Ser. No. 60/671,798 and Ser. No. 60/672,195, both filed on Apr. 15, 2005. The disclosure of each application is, in its entirety, incorporated herein by reference.

FIELD OF THE INVENTION

The invention generally relates to containers. It relates particularly to insulated containers for hot drinks or the like, a method of fabricating such containers and an apparatus for fabrication of such containers.

BACKGROUND OF THE INVENTION

There are many examples in the prior art of hand-held, insulated containers for hot liquids such as coffee, tea, soups and the like. Examples may be found in U.S. Pat. No. 2,266,828, U.S. Pat. No. 4,007,670, U.S. Pat. No. 5,145,107, U.S. Pat. No. 5,460,323, U.S. Pat. No. 5,524,817, U.S. Pat. No. 5,685,480, and U.S. Pat. No. 6,663,926. Each of the containers disclosed there includes an inner cup and an outer shell separated by an air gap. In modern containers of this type, the cup is fabricated of thin paperboard coated inside with a polyethylene resin or the like. The inner cup and outer shell are fastened together by gluing them in strategic locations at top and bottom or, in some recent instances, by heat sealing them together. The air gap between the cup body wall and the shell is conventionally maintained by spacers of varying configuration.

SUMMARY OF THE INVENTION

It is an object of the present invention to provide an insulated container having an improved inner cup and outer shell construction.

It is another object to provide an improved method of fabricating an insulated container.

It is another object to provide an improved method of bonding the cup and shell together in an insulated container.

It is still another object to provide an apparatus for fabricating an improved insulated container.

The foregoing and other objects are realized in accord with the present invention by providing an insulated container wherein a thermo-sealable plastic coating is provided on at least one of the inside of the cup shell or the outside of the cup body. The coating is heated and the cup body is seated within the shell, after which at least one bonding spot and/or bonding area for fastening the shell to the cup body with the plastic coating is formed within a corresponding contact path. This "contact path" is generally a virtual contact path where the outer surface of the cup body and inner surface of the shell may be in contact when the cup is seated within the shell. However, it is not necessary that there be actual contact between the corresponding walls of shell and cup body along all of their common circumferences. The contact path may only extend partially along the common circumferences, and within this contact path corresponding bonding spots and/or bonding areas are located. These spots or areas are locally formed by a method wherein shell and cup wall are pressed together at one or more of such bonding spots and/or bonding areas within said contact path. Because the corresponding thermo-sealable plastic coating is melted prior to inserting the cup in the shell, the cup and shell are bonded in the corresponding bonding spots and/or bonding areas by hardening of this coating as it cools.

In the alternative, it is also possible that the bonding path be a continuous, annular path which completely encircles the cup body and shell. Such a path may also have a certain width in a vertical direction, i.e., perpendicular to the corresponding circumferential direction.

According to the invention, it is possible to use one bonding spot or bonding area because the bonding is only used to prevent the inner cup from separating during handling of the container for assembly, packaging, nesting or the like. After a corresponding hot drink or the like is poured into the container, the inner cup will be retained within the shell by the weight of the drink, so that a corresponding bonding spot or bonding area need only provide a minimal fastening force.

According to the invention it is also possible to more securely fasten cup body and shell to each other by, for example, providing a number of bonding spots and/or bonding areas formed along the contact path, all separated from each other by bond free areas in the contact path. Moreover, the bonding spots and/or bonding areas may be arranged side-by-side and separated from each other in horizontal and/or vertical directions within the contact path. This means that single bonding spots or bonding areas are arranged in horizontal or vertical directions, or that a group of such bonding spots or bonding areas is formed with each group arranged in a vertical direction, and that such groups are then arranged side-by-side, circumferentially of the container.

It is also possible to provide that corresponding bonding spots and/or bonding areas are unevenly distributed in a circumferential direction. However, to improve the assembly of the container, and also the corresponding method of fabricating, it may be advantageous if the corresponding spots or areas are evenly distributed.

The insulated container of the invention has a gap between the cup wall and the shell wall in a lower section of the container. Generally the air gap should be maintained without any heat transferring connections. Consequently, it is advantageous to form the corresponding contact path between an annular upper wall section of the cup body and an upper, essentially cylindrical section of the shell. In this part of the container, a gap is unnecessary because the contact path is disposed higher than the level of the beverage in the container.

It is preferable to arrange the bonding spots and/or bonding areas immediately adjacent to the lower edge of an annular upper wall section of the cup body. The lower edge is preferably defined by an annular shoulder. Below this shoulder is where the air gap begins.

Different materials may be used for the shell and the cup, and at least one of those components may be made of plastic. For recycling reasons, it is also possible that the cup and/or the shell may be made of paperboard. To obtain sufficient imperviousness to hot fluid, the paperboard for forming the cup is preferably coated with the above mentioned polyethylene resin or the like. The paperboard can also be provided with a thermo-sealable plastic coating on the outside of the cup wall, the inside of the shell wall or on both of those walls.

The corresponding bonding spots or bonding areas may also have different shapes. For example, bonding spots may be circular, rectangular or have other cross-sections. The corresponding bonding areas may also be in the form of short stripes and the stripes may be horizontally arranged or may also be inclined with respect to circumferential direction.

The corresponding plastic coating may be melted by local heating only. However, it is also possible that an annular strip of plastic coating be heated along its entire length.

To obtain sufficient force to press the cup wall and the shell wall together until the thermo-sealable plastic coating is hardened, an annular inner member with or more one radially displaceable, or protruding, pressing elements may be positioned inside the cup body. The pressing element is employed to press against an outer member and, as a results, to press the walls of cup body and shell together and form one or more bonding spots and/or bonding areas. It is also possible that the corresponding pressing elements are part of the outer member or that pressing elements are provided on both members.

It is also possible that such pressing members do not directly contact either wall of the container, but that they deform an annular, inflexible ring from its inside, for example. This ring, with its deformed parts on its outside, then presses the walls of the cup body and shell together by cooperation with the outer member.

An apparatus for bonding the outer shell and the inner cup together to form an insulated container for hot liquids or the like comprises an inner member to be arranged within the inner cup. It also comprises an outer member generally concentric with said inner member and arranged outside the outer shell. The outer member has at least one radially protruding or movable pressing element to press opposed shell and cup walls together and form one or more bonding spots and/or bonding areas around the circumference of shell and cup. The inner member may be an annular ring or a disk that is inserted within the cup body. This annular ring or disk may support the corresponding pressing element or elements such that they are movable in a radial direction. A simple embodiment of such a movable pressing element is a plunger movably supported by the inner or outer members. To obtain evenly distributed bonding spots or bonding areas, the corresponding number of radially movable pressing elements are also evenly distributed around the circumference of the inner or outer members.

To hold the shell prior to insertion of the cup body, it is advantageous that the apparatus comprise a receiving member with a skirt and an upper flange. To also use the receiving member as an outer member, it is possible that a counter pressing extension extend from the upper flange of the receiving member in essentially a vertical direction. Then, the corresponding movable pressing elements may be part of the inner member and no second, separate member is necessary. It is also possible to use the receiving member for holding the cup body in a predetermined position. This may be realized by using an upper end of the counter pressing extension as a seat for the outward curl of the cup body.

Although the container, method of container fabrication and apparatus for doing so have been discussed in the preferred context of hot melt bonding an inner cup and outer shell together, it should be understood that a variation of the container, method and apparatus embodying features of the invention might employ glue spots or glue areas to form the connection or connections. Such glue spots or areas might be used with coated or uncoated paperboard cups and shells, the glue being pre-applied to the outside of the cup or the inside of the container in the same or a similar pattern to hot melt spot bond placement, for example. Small glue spots or areas are then spread by pressing the wall and shell together in substantially the same manner used in pressing them together for hot melt bonding.

BRIEF DESCRIPTION OF THE DRAWINGS

The invention, including the construction of the container, its method of manufacture and a corresponding apparatus for manufacture is illustrated more or less diagrammatically in the drawings, in which.

DETAILED DESCRIPTION OF THE PREFERRED EMBODIMENTS

Figure 1:
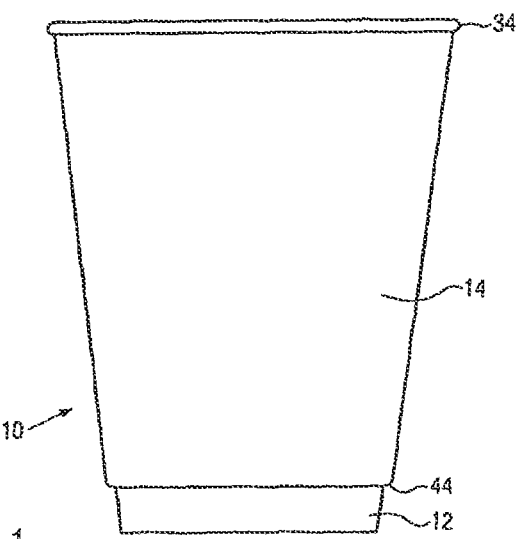
FIG. 1 is a side elevational view of an insulated container comprising an inner cup, and an outer shell, and embodying a first form of the present invention.
Figure 2:
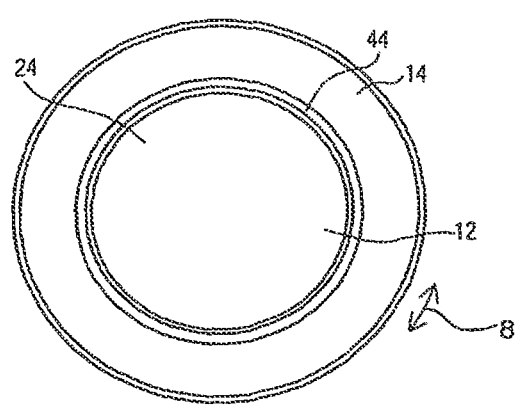
FIG. 2 is a bottom plan view of the container of FIG. 1.
Figure 3:
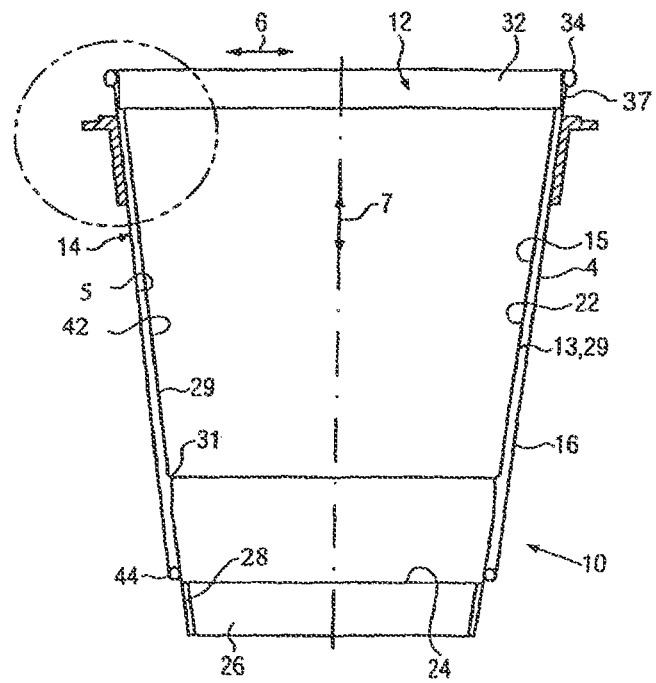
FIG. 3 is a side elevational view of the container in FIG. 1, with the elements of the container in vertical section.
Figure 4:
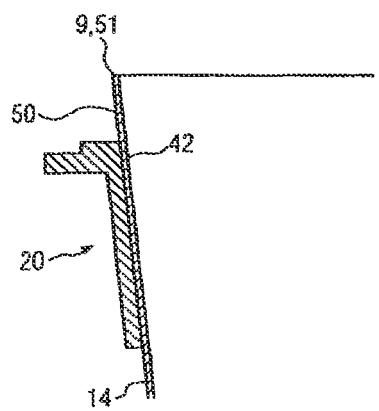
FIG. 4 is an enlarged, vertical sectional view through the top of the shell of the container of FIG. 1, showing a first container assembly step.

Referring now to the drawings, and particularly to FIGS. 1 to 3, a hot drink container embodying features of a first form of the present invention is illustrated generally at 10. The container includes an inner cup 12 and an outer shell 14 telescoped together and spot bonded to each other according to the present invention.

As seen in FIG. 3, the inner cup 12 includes a cup body 22 and a cup bottom 24, separately formed of paperboard in a conventional manner. Prior to fabrication, the paperboard is coated on one side with thermo-sealable plastic material such as polyethylene or the like. The assembled cup 12 then has an internal coating 15 of polyethylene over all or a portion of its internal surface.

A frusto-conical wall 29 of the cup body 22 has an annular shoulder 31 formed inwardly from it near the cup bottom 24. The shoulder 31 acts as a stop for the cup above when a plurality of cups are stacked.

The cup bottom 24 is seated in the body 22 in the manner illustrated. A segment 26 of the lower edge of the cup wall 29 is folded inwardly and upwardly to capture an annular, downwardly extending skirt section 28 of the cup bottom 24.

Figure 5:
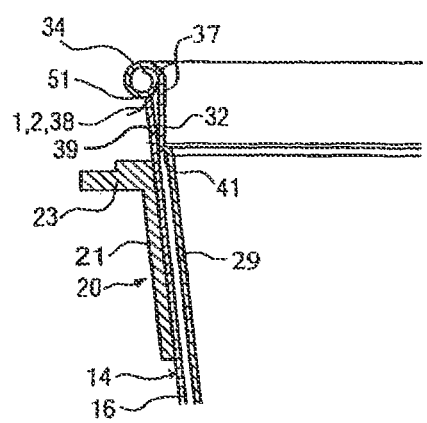
FIG. 5 is a view similar to FIG. 4 showing insertion of the cup in the shell.

The cup body 22 also has an annular upper shoulder 32 formed outwardly of its frusto-conical side wall 29 for a distance of five mm or more downwardly from an outward curl 34 which forms an upper edge of the body. Between the shoulder 32 and the curl 34, an upper wall section 37 with a cylindrical outer surface 38 (see also FIG. 5) is arranged. A lower portion 39 of the surface, at the shoulder's edge 41, serves as a bonding spot or bonding area 1 or 2 to which the annular inner surface of the shell 14 is bonded, in a manner hereinafter discussed.

The outer shell 14 is, like the cup wall 29, frusto-conical in shape. The shell 14 is formed from paperboard which has an internal coating 42 of a thermo-sealable plastic material. The internal coating may be over all the shell 14, or only in a bonding area or spot along a corresponding contact path 3 (see also FIG. 7) of the shell. The shell 14 has an inward curl 44 (see FIG. 3) formed on its lower edge, and this inward curl engages the outer surface 4 of the cup body wall 29 above the lower end of the cup 12, at a distance corresponding approximately to the height of the cup bottom 24.

An annular upper edge 9 or 51 (see also FIG. 5) of the shell 14 is immediately adjacent the curl 34 of the cup body 22 and may abut the curl from below. The shell 14 extends downwardly from there to a narrow, annular surface where it engages, at least partially, the upper wall section 37 and the annular outer surface 38 at and slightly above the lower edge 41 of the shoulder 32.

The thermo-sealable plastic coating 42 inside shell 14 is locally melted before the cup 12 and the shell 14 are assembled. After assembly, the shell 14 is thermally bonded at one or more bonding spots or bonding areas 1,2 which are illustrated, for example, in FIG. 6 as the spot weld 53. The shell 14 is bonded to the cup body shoulder 32 or the annular outer surface 38 adjacent its lower edge 41, i.e. at a distance of about five mm from the curl 34. Although the use of three spot welds 53, annularly spaced at regular intervals, is described here, there may be as few as one or there may be more than three. Furthermore, they may not be irregularly spaced if more than one spot weld is used. It is also possible to arrange a number of such bonding spots or bonding areas above each other, i.e., in a direction 7 (see FIG. 3) or side-by-side in horizontal direction 6 or circumferential direction 8 (see FIG. 2).

Figure 6:
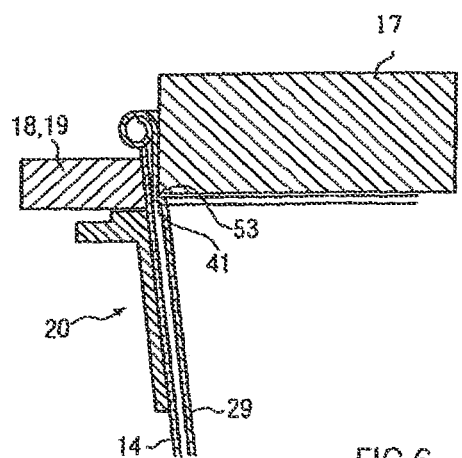
FIG. 6 is a view similar to FIG. 4 showing dot welding of the shell and cup in a further container assembly step.
Figure 7:
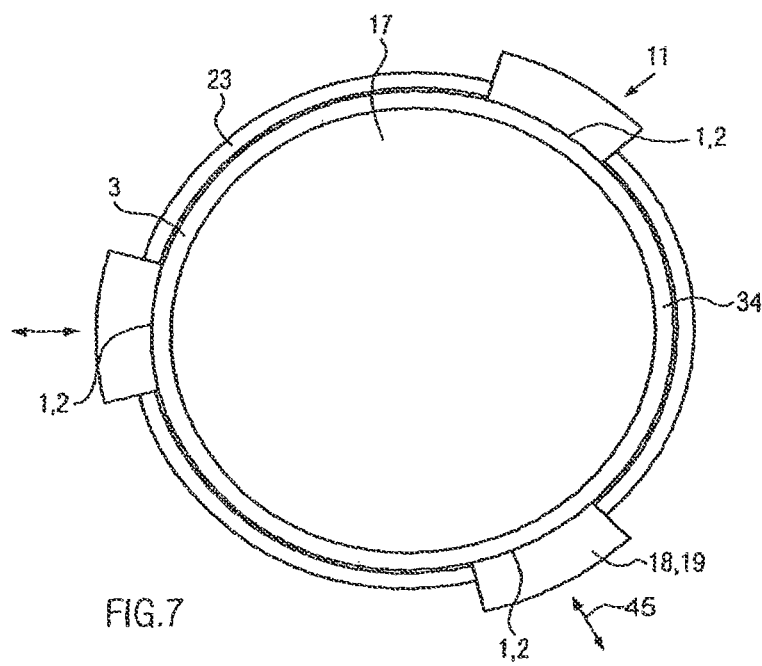
FIG. 7 is a top plan view of the container and a corresponding tool or apparatus for dot welding.
Figure 8:
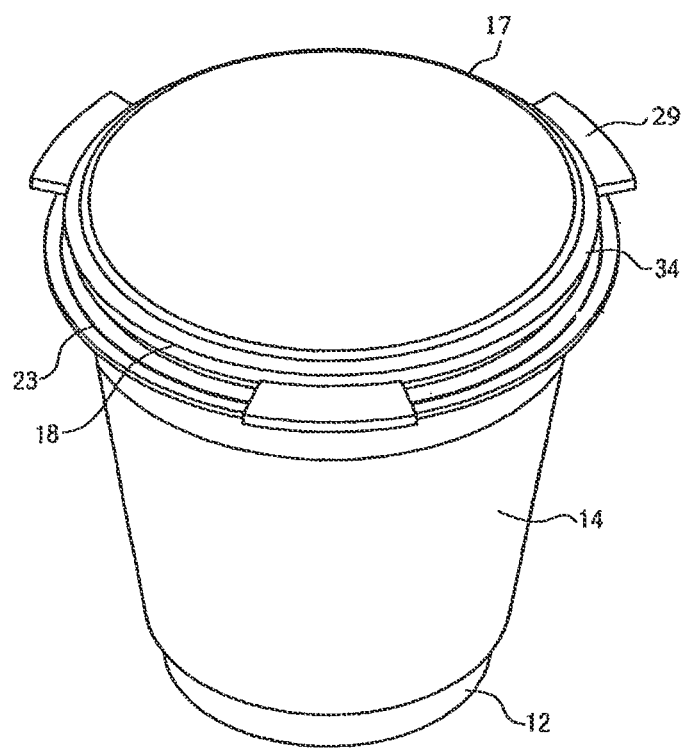
FIG. 8 is a perspective view of a container mated with the tool of FIG. 7 for dot welding according to the invention.
Figure 9:
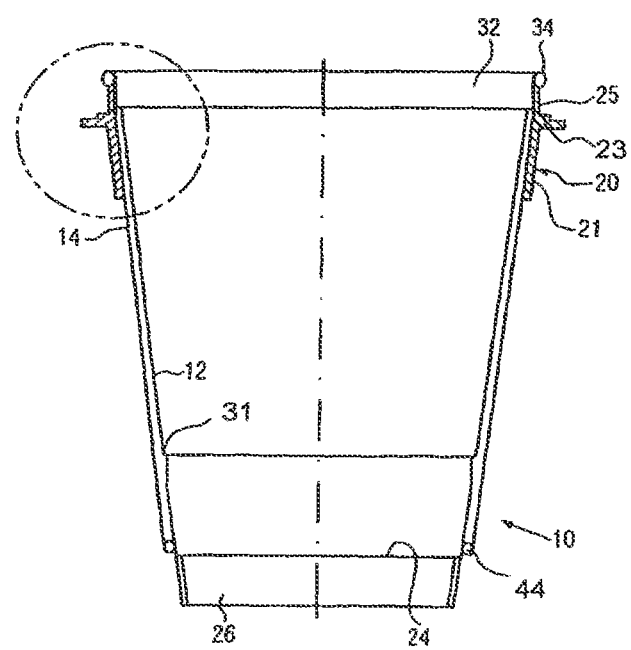
FIG. 9 is a view similar to FIG. 3 of an insulated container embodying a second form of the present invention.

Referring now to FIGS. 4 to 8, container 10 is fabricated according to the invention in the following steps:

a shell 14 is fabricated of paper board selectively coated internally with a thermo-sealable plastic such as polyethylene by forming the shell around a frusto-conical mandrel;

the previously formed shell is seated inside a correspondingly shaped receiver or receiving member 20 (see FIG. 4) comprising a frusto-conical skirt portion 21 (see FIG. 5) which engages the outer surface of the shell wall 16, the upper end of the skirt portion 21 having a radially outwardly extending upper flange 23;

an annular heating element is positioned close to the inside of the shell 14 and strips of the polyethylene coating are heated to its melting point (see FIG. 6);

a previously assembled cup 12 is drawn by suction into the shell until the annular periphery of its upper shoulder 32 seats against the shell at the melted strip along a contact path 3 (see also FIG. 7);

an annular disk 17 is then positioned inside the cup body 22 and snugly engages the inner surface of the cup body above the upper shoulder 32 (see for example FIGS. 6 to 8);

an annular ring 18 incorporating three radially extendable plungers as pressing members 19 is then placed around the shell 14 at the level of the melted strip, and the plungers are extended to press shell and cup walls together (see for example FIG. 6) until they bond together at, for example, three spot welds 53 or bonding spots 1 or bonding areas 2, respectively;

the disk and ring are then removed and the assembled container is ejected from the receiving member 20.

As seen in FIG. 6, it is not necessary that the upper wall section 37 is contacted by all of the upper end section of shell wall 16, and it is possible that a small gap is provided between both just below the outward curl 34. Only along the contact path 3 (see FIG. 7), which is arranged adjacent to the upper annular shoulder 32, are corresponding bonding spots or bonding areas produced by pressing first member 17 and second member 18 together (see FIGS. 6 and 7).

In FIG. 8, and also in FIG. 7, the ring-like outer member 18 with the plunger 19 is illustrated. It is arranged between the upper surface of upper flange 23 of the receiving member 20 and the lower end of outward curl 34 (see again FIG. 6).

FIG. 7 also illustrates that the corresponding plungers, as pressing members 19, are evenly spaced circumferentially 8 around the container 10 so that three bonding spots or bonding areas are formed. The corresponding pressing members 19 are movable in the displacement direction 45.

Figure 10:
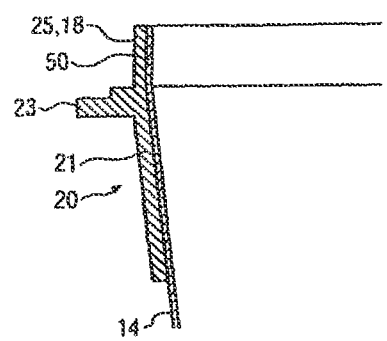
FIG. 10 is a view similar to FIG. 4 of the second container embodiment showing the first assembly step.
Figure 11:
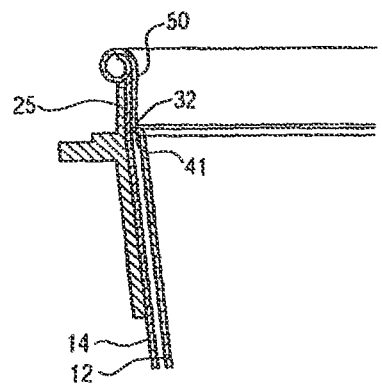
FIG. 11 is a view similar to FIG. 5 of the second container embodiment in a further assembly step.
Figure 12:
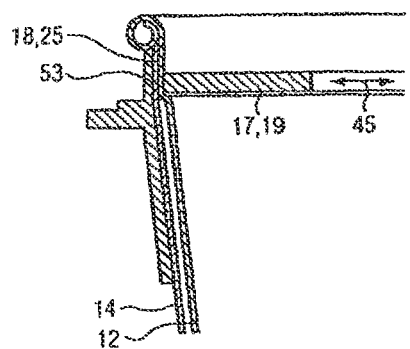
FIG. 12 is a view similar to FIG. 6 of the second container embodiment showing a further assembly step.

Referring now to FIGS. 10 to 12, a container incorporating features of a second embodiment of the present invention is seen generally at 10 in various stages of assembly. The container 10 is identical in construction to the previous described container, except for one feature. The cup 12 of the container is identical to the previously described cup, but the shell 14 has a short cylindrical section 50 formed at its upper end. This cylindrical section 50 of the shell 14 seats flush against the outer surface 38 of upper wall section 37 (see also the previous figures).

The cup 12 and the shell 14 are spot bonded together at one or more spots 53, as bonding spots 1 or bonding areas 2 corresponding to those in the cup 10, i.e., around the shoulder 32 immediately adjacent to its lower edge 41. Although the cylindrical section 50 seats flush against cup 12 above the shoulder 32, it should be understood that the section 50 is not bonded to the cup body above the ring of spot bonds 53 and that corresponding spot bonds or spot welds 53 are separated from each other by bond-free areas along the corresponding contact path 3.

Also, in this second embodiment the receiving member 20 is different from that of the first embodiment in that it has an integrally formed outer member 18 which is formed by a counter-pressing extension 25 extending vertically from an upper surface on upper flange 23 of the receiving member 20. An upper end 27 of the extension 25 abuts the curl 34 from below.

The container 10 of the second embodiment is fabricated according to the invention in the following steps:

a shell 14 is fabricated of paperboard selectively coated internally with a thermo-sealable plastic such as polyethylene by forming the shell around a frusto-conical mandrel having an upper, circular cylindrical section;

the shell 14 is then removed from the mandrel and seated inside the corresponding shaped receiving member 20 (see FIG. 10);

an annular heating element is positioned close to the inside of the shell 14 and a strip of the polyethylene coating is heated to its melting temperature;

a previously assembled cup 22 is then drawn by suction into the shell 14 until the annular periphery of the shoulder 31 of the cup body seats against the shell, at the melted strip (see FIG. 11);

an annular ring as an inner member 17, (see FIG. 12), incorporating three radially extendable plungers as pressing members 19, is then positioned inside the cup body 22 at the level of the melted strip and the plungers are extended to press the shell and cup walls together against the outer receiving member 20 and, in particular, against the corresponding counter pressing extension 25, until they are bonded together at, for example, three spot or dot welds 53 (see FIG. 12);

the ring 17 is then removed and container 10 is ejected from the receiving member 20.

Each container embodiment hereinbefore described is characterized by having a thermo-sealable plastic coating inside its shell 14 bonded to the outer surface of a cup 12 by heat and pressure at a plurality of spot welds 53 which may be bonding spots 1 or bonding areas 2. The corresponding spot welds extend around and between those components. The spot welds lie in an annular path (see contact path 3) adjacent the bottom edge of an upper wall section 37 of the cup body or upper cylindrical section 50 of the shell 14. Either of the container embodiments could also be fabricated by providing the thermo-sealable plastic bonding material applied locally to the exterior of the cup body at the upper wall section 37, without departing from the present invention. In such a case the bonding material would be heated from the outside the cup before inserting it into the shell, of course.

Each of the first and second embodiment containers 10 of the invention has been described in the preferred context of hot melt bonding. The invention also contemplates that in the context of containers substantially identical to those described, glue spots or glue areas might be employed to bond cup and shell bodies together. With respect to glue, the same pattern of spots or areas previously described for hot melt bonding may be employed. Also, glue might be applied as a strip along the circumference of the cup or shell, either alone or in combination with spots or areas of glue, or with resin layer bonds. When glue spots are used, very small spots of glue are applied and the process of pressing cup and shell together in the spot areas suffices to spread the glue.

While preferred embodiments of the invention have been described, it should be understood that the invention is not so limited, and modifications may be made without departing from the invention. The scope of the invention is defined by the appended claims, and all products, methods an apparatuses that come within the meaning of the claims, either literally or by equivalence, are intended to be embraced therein.

The invention claimed is:

1. A method of fabricating an insulated container, comprising the steps of:
  a) forming a generally frusto-conical shell;
  b) providing a bonding material on an inside of said shell and/or on an outside of a generally frusto-conical cup;
  c) inserting said cup into said shell until the inside of the shell or the outside of the cup wall seats against the bonding material along a contact path, and
  d) pressing the shell and the cup wall together in a substantially radial direction at a plurality of bonding spots to form a plurality of bonding spots in less than an entirety of the contact path,
  wherein said bonding spots are separated from each other by unbonded areas along said contact path and the sections of the shell that are not bound to the cup are spaced apart from the cup wall.

2. The method according to claim 1, further comprising:
  positioning an annular or first member with at least one radially displaceable or protruding pressing element inside the cup; and
  pressing with the pressing element against an external or second member to press the cup wall and the shell together to form the plurality of bonding spots.

3. A method of fabricating an insulated container, comprising the steps of:
  a) forming a generally frusto-conical shell;
  b) heating a thermo sealable plastic coating provided on an inside of said shell and/or on an outside of a generally frusto-conical cup to its melting point;
  c) inserting said cup into said shell until the inside of the shell or the outside of a wall of the cup seats against the melted plastic along a contact path, and
  d) pressing the shell and the cup wall together in a substantially radial direction to form a plurality of bonding spots in less than an entirety of the contact path,
  wherein said bonding spots are separated from each other by unbonded areas along said contact path and the sections of the shell that are not bound to the cup are spaced apart from the cup wall.

4. The method according to claim 3 further comprising:
  applying the thermo sealable plastic coating as an annular strip on the inside of said shell and/or on the outside of the generally frustoconical cup;
  wherein heating the thermo sealable plastic coating comprises completely heating the annular strip.

5. The method according to claim 3 further comprising:
  applying the thermo sealable plastic coating as an annular strip on the inside of said shell and/or on the outside of the generally frustoconical cup,
  wherein heating the thermo sealable plastic coating comprises heating only parts of said annular strip, wherein the parts of the annular strip that are heated form or comprise said bonding spots.

6. The method according to claim 3 further comprising:
  positioning an annular or first member with a plurality of radially displaceable or protruding pressing elements inside the cup body; and
  pressing, with the plurality of radially displaceable or protruding pressing elements, against an external or second member to press the walls of the cup body and the shell together to form the one or more bonding spots.

7. The method according to claim 1 further comprising:
  positioning an annular or first member with a plurality of radially displaceable or protruding pressing elements inside the cup body; and
  pressing, with the radially displaceable or protruding pressing elements, against an external or second member to press the walls of the cup body and the shell together to form the one or more bonding spots.

8. The method according to claim 1, wherein said bonding material is a thermo sealable plastic coating the method comprising:
  applying the thermo sealable plastic coating as an annular strip on the inside of said shell and/or on the outside of the generally frustoconical cup; and
  heating the annular strip completely.

9. The method of claim 1 wherein the contact path extends about a perimeter of the cup and the shell adjacent to an upper annular shoulder of the cup.

10. The method of claim 3 wherein the contact path extends about a perimeter of the cup and the shell adjacent to an upper annular shoulder of the cup.

11. A method of fabricating an insulated container, the method comprising:
  a) forming a generally frusto-conical cup having an annular upper shoulder;
  b) forming a generally frusto-conical shell having an inward curl at a lower edge thereof;
  c) providing a bonding material on an inside of the shell or on an outside the cup;
  c) inserting the cup into the shell until the inside of the shell or the outside of the cup seats against the bonding material along a contact path, thereby forming a substantially uniform air gap between the cup and the shell having a predetermined spacing provided by the inward curl and the annular upper shoulder; and d) pressing the shell and the cup together in a substantially radial direction to form a plurality of bonding spots in less than an entirety of the contact path wherein said bonding spots are separated from each other by unbonded areas along said contact path.

12. The method of claim 11 wherein the contact path extends about a perimeter of the cup and the shell adjacent to an upper annular shoulder of the cup.

13. The method of claim 11 further, wherein the bonding material is a thermo sealable plastic coating, the method further comprising:

heating the thermo sealable plastic coating to its melting point;

wherein the cup is inserted into the shell while the thermo sealable plastic coating is melted, so that the inside of the shell or the outside of the cup wall seats against the melted plastic along the contact path, and wherein the plurality of bonding spots are separated from each other in a circumferential direction by non-bonded spots along the contact path.

14. The method of claim 3 wherein the contact path includes every portion of the shell and cup wall that are in contact with one another.

15. The method of claim 1 wherein pressing the shell and the cup wall together comprises pressing the shell and the cup wall together in less than the entirety of the contact path.

16. The method of claim 5 wherein pressing the shell and the cup together in the substantially radial direction comprises pressing the shell and the cup together in less than the entire contact path.

17. A method of fabricating an insulated container, the method comprising:

providing a generally frusto-conical cup and a generally frusto-conical shell, wherein at least one of the cup and shell has a surface that is selectively coated with a thermo-sealable plastic;

seating the generally frusto-conical shell inside a receiving member that has a skirt portion to engage an outer surface of the generally frusto-conical shell;

positioning an annular heating element proximate the generally frusto-conical cup or the generally-frustoconical shell so as to melt a strip in the thermo-sealable plastic coating;

inserting the generally frusto-conical cup into the generally frusto-conical shell so that the inside of the shell or the outside of the cup seats against the melted strip of thermo-sealable plastic;

positioning an annular disk inside the generally frusto-conical cup at a level of the melted strip of thermo-sealable plastic;

placing an annular ring with a plurality of radially-extendable plungers around the frustoconical shell at the level of the melted strip of thermo-sealable plastic; and extending the radially-extendable plungers in a radial direction toward the annular disk to press the generally frusto-conical shell against the generally frusto-conical cup until the generally frusto-conical shell is bonded to the generally frusto-conical cup at a plurality of spots corresponding to positions of the radially-extendable plungers.

18. The method of claim 1 wherein said bonding spots are separated from each other in a circumferential direction by the unbonded areas along said contact path.

19. The method of claim 1 further comprising:

forming an outward curl at an upper edge of the cup;

forming an annular upper shoulder five millimeters or more below the outward curl; and forming an upper wall section with a cylindrical outer surface between the outward curl and the annular upper shoulder, wherein forming the plurality of bonding spots in less than an entirety of the contact path comprises forming the bonding spots in a lower portion of the cylindrical outer surface.

20. The method of claim 19 further comprising:

folding a segment of a lower edge of the cup inwardly and upwardly;

wherein, upon inserting said cup into said shell, the lower portion of the cylindrical outer surface comprises the contact path and the folded segment at the lower edge of the cup.

21. The method of claim 3 wherein said bonding spots are separated from each other in a circumferential direction by the unbonded areas along said contact path.

22. The method of claim 5 wherein pressing the shell and the cup wall together comprises pressing the shell and the cup wall together in less than the entirety of the contact path.

23. The method of claim 17 wherein said plurality of bonded spots are separated from each other by unbonded areas along said contact path.

24. The method of claim 17 wherein the cup comprises paperboard.

25. The method of claim 17 wherein the shell comprises paperboard.

26. The method of claim 24 wherein the inside of the paperboard is lined with a thermo-plastic material.

* * * * *